United States Patent
Wears

[19]

[11] Patent Number: 6,003,551
[45] Date of Patent: Dec. 21, 1999

[54] BIDIRECTIONAL FLUID CONTROL VALVE

[75] Inventor: William E. Wears, Marshalltown, Iowa

[73] Assignee: Fisher Controls International, Inc., Clayton, Mo.

[21] Appl. No.: 08/676,774

[22] Filed: Jul. 8, 1996

Related U.S. Application Data

[60] Provisional application No. 60/001,178, Jul. 14, 1995.

[51] Int. Cl.[6] .................................................. F16K 11/065
[52] U.S. Cl. ........................................................ 137/625.33
[58] Field of Search .................................... 251/318, 356; 137/625.33, 625.34

[56] References Cited

U.S. PATENT DOCUMENTS

| | | | |
|---|---|---|---|
| 940,239 | 11/1909 | Dikkers . | |
| 1,471,229 | 10/1923 | Williston . | |
| 2,163,472 | 6/1939 | Shimer | 251/144 |
| 2,307,546 | 1/1943 | Shimer | 251/144 |
| 2,393,442 | 1/1946 | Yellott et al. | 137/625.34 X |
| 2,481,214 | 9/1949 | Harper | 251/157 |
| 2,483,163 | 9/1949 | Warren et al. | 251/156 |
| 2,507,851 | 5/1950 | Bryant et al. | 251/155 |
| 2,621,015 | 12/1952 | MacGregor | 251/142 |
| 2,969,218 | 1/1961 | Shaw | 251/333 |
| 3,180,360 | 4/1965 | Pavlin | 137/625.5 |
| 3,204,930 | 9/1965 | Bredtschneider et al. | 251/361 |
| 3,647,178 | 3/1972 | Adams | 251/148 |
| 4,220,172 | 9/1980 | Stager | 137/74 |
| 4,385,747 | 5/1983 | Renaud, Jr. et al. | 251/315 |
| 4,483,514 | 11/1984 | Kennedy | 251/327 |
| 4,634,099 | 1/1987 | Danko et al. | 251/335.3 |
| 4,735,224 | 4/1988 | Pluviose | 137/1 |
| 4,815,706 | 3/1989 | Feuling | 251/356 |
| 4,842,246 | 6/1989 | Floren et al. | 251/333 |
| 4,905,647 | 3/1990 | Kizer et al. | 123/337 |
| 4,944,489 | 7/1990 | Adams et al. | 251/306 |
| 5,069,423 | 12/1991 | Amorese et al. | 251/144 |
| 5,205,535 | 4/1993 | Nevrekar | 251/163 |
| 5,342,028 | 8/1994 | Nevrekar | 251/163 |

FOREIGN PATENT DOCUMENTS

| | | |
|---|---|---|
| 317920 | 8/1995 | Japan . |
| 317921 | 8/1995 | Japan . |
| 317922 | 8/1995 | Japan . |

*Primary Examiner*—John Fox
*Attorney, Agent, or Firm*—Marshall, O'Toole, Gerstein, Murray & Borun

[57] ABSTRACT

A bidirectional flow fluid control valve having increased flow capacity in a flow down condition, a flow up condition or, preferably, in both flow conditions. The valve has a curved surface on the top portion of the valve plug or on the inner annular surface of the body web below the valve seat. Preferably, the valve has curved surfaces in both locations. A variety of radii of curvature at those locations have been found to increase flow capacity. Adjacent the curved portions of the valve plug surface or the body web inner annular surface, uncurved portions may be employed.

8 Claims, 5 Drawing Sheets

BIDIRECTIONAL FLUID CONTROL VALVE

This application claims the benefit of U.S. Provisional Application No. 60/001,178, filed Jul. 14, 1995.

BACKGROUND OF THE INVENTION

This invention relates to fluid control valves and particularly to such valves used to control the flow of fluid in pipeline and processing systems.

Conventional fluid control valves made of a standard construction include a flow passageway, a valve seat with a thru hole in the passageway, and a valve plug having a square-edged top portion on one side of the valve seat. Such conventional valves also have an uncurved body web below the thru hole and on the other side of the valve seat.

In a downflow valve, fluid flow is through the valve flow passageway from the valve plug side, down the thru hole in the valve seat and by the body web. In an upflow valve, fluid flow is from the body web up the thru hole in the valve seat and by the valve plug.

It is desired to increase the flow capacity of such control valves. It is further desired to provide a fluid control valve having increased flow capacity in either flow direction through the valve, as compared to conventional control valves.

SUMMARY OF THE INVENTION

The invention is directed to a fluid control valve having increased flow capacity in a flow down condition, a flow up condition, or, preferably, in both flow conditions. More particularly the invention is directed to a bidirectional flow fluid control valve having a curved surface in either the top portion of the valve plug, or in the body web beneath the thru hole, or in both locations.

In accordance with the present invention, providing a curved surface having a radius of curvature of about 0.25 inches on the top perimeter edge of the valve plug increased the valve flow capacity in the flow down condition as much as six percent compared to conventional valves. Also, it was found that providing a curved surface having a radius of curvature of about 0.25 inches in the lower annular perimeter of the body web increased the flow capacity in the flow up condition as much as ten percent compared to conventional valves. The above two valves containing surface curvature in accordance with the present invention had thru holes having diameters of 1.5 inches. Radii of curvature for the top perimeter edge of the valve plug and the annular perimeter of the body web may vary with valve size.

DETAILED DESCRIPTION OF THE PREFERRED EMBODIMENT

Figure 1:
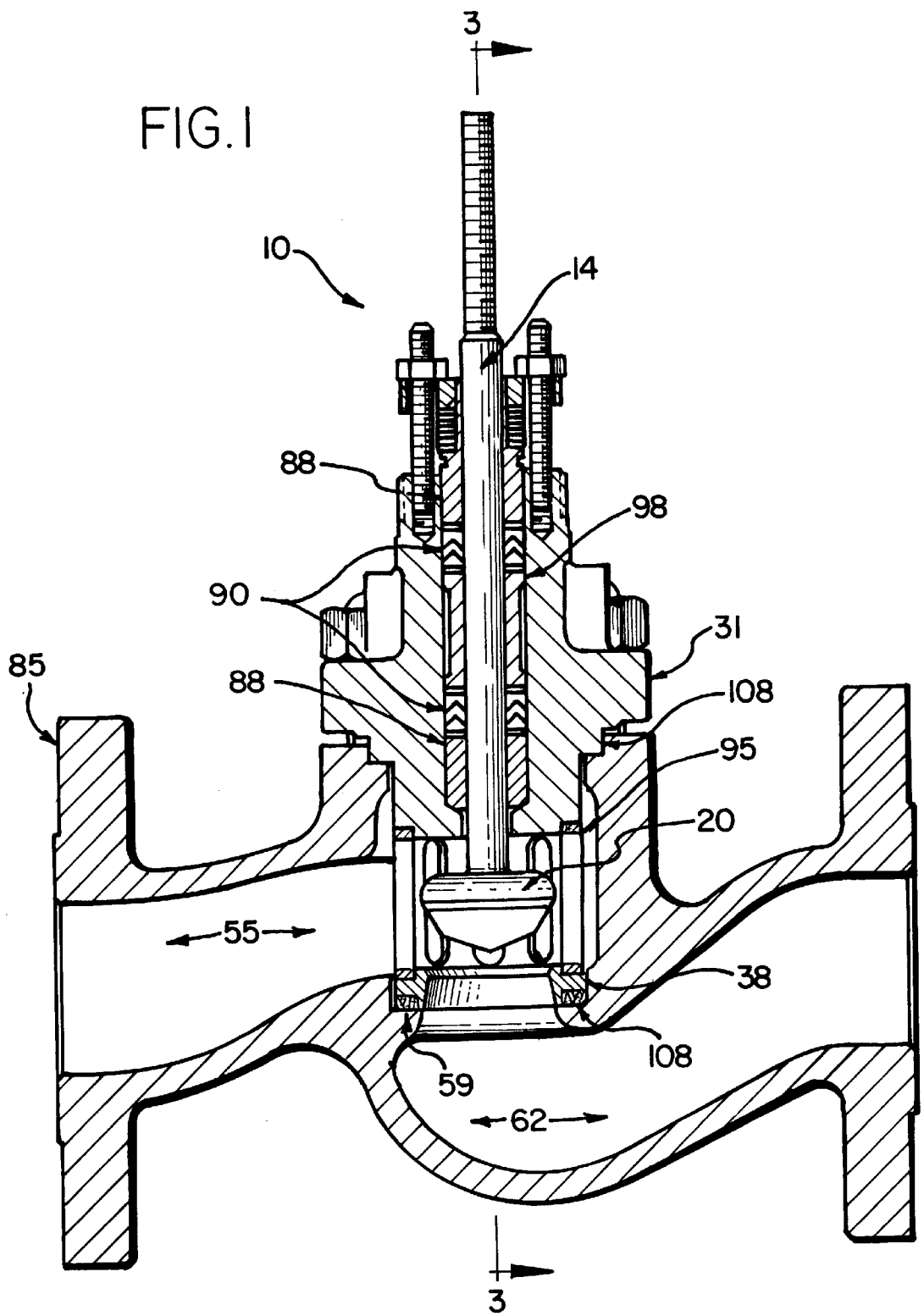
FIG. 1 is a sectional view of a valve according to the present invention.

A valve, generally designated by reference numeral 10, is shown in FIG. 1. At the center of the valve is a valve stem 14. A curved surface 15 is located on stem 14 toward a bottom 17 of stem 14. Curved surface 15 is not present in all embodiments of the present invention. Connected to bottom 17 of stem 14 is a valve plug, which is generally designated by reference numeral 20. A stem assembly 21 comprises stem 14 and valve plug 20. Valve plug 20, best shown in FIG. 2, preferably comprises three portions: a top portion 22, a seat-engaging portion 25, and a bottom portion 28. Bottom portion 28 will be referred to as plug contour 28. The relative sizes of those three portions varies among different embodiments.

In a preferred embodiment a periphery 29 of top portion 22 of valve plug 20 has a rounded edge designated curved surface 30. Curved surface 30 of top portion 22 generally slopes downward from bottom 17 of stem 14 toward seat-engaging portion 25.

The diameter of valve plug 20 should be greater than the diameter of stem 14 to prevent blowout. Blowout can occur when there is pressure in the valve body which can eject stem 14 from a bonnet 31. The thickness of top portion 22 of valve plug 20 is a factor for determining a radius of curvature suitable for curved surface 30 of top portion 22. Thickness is measured along stem assembly axis 33, from the top of seat-engaging portion 25 to bottom 17 of stem 14. In some embodiments, as will be discussed further below, the thickness of top portion 22 is the maximum radius of curvature possible for curved surface 30. In many embodiments, however, the radius of curvature can exceed the thickness of top portion 22.

Although curved surface 30 having any radius of curvature will have the advantages of the present invention in comparison to square edges on periphery 29 of top portion 22 of valve plug 20, some radii of curvature are more effective than others. As discussed in more detail in Example 1, a radius of curvature of about 0.25 inches was found to be significantly more effective at increasing flow capacity than a radius of curvature of about 0.19 inches in a valve having a thru hole 35 which had a diameter 36 of 1.5 inches. The interior of a seat ring 38 defines thru hole 35. Diameter 36 of thru hole 35 is defined as the smallest inner diameter of seat ring 38. The valve having a valve plug with a radius of curvature of about 0.19 inches exhibited increased flow capacity compared to a similar valve having a standard valve plug (i.e. a valve plug lacking curved surface 30 on top portion 22).

In a more preferred embodiment periphery 29 of top portion 22 of valve plug 20 has a straight section 40 radiating from bottom 17 of stem 14 and substantially perpendicular to stem assembly axis 33. In this embodiment an upper end 42 of curved surface 30 of top portion 22 is located where straight section 40 terminates, which is a position lateral to bottom 17 of stem 14. This can be seen in FIG. 2. Straight section 40, without significantly decreasing the flow capacity of valves having curved surface 30, facilitates manufacture of valves having curved surface 30. Machining, as opposed to casting, of top portions 22 having curved surfaces 30 is made easier by the presence of straight section 40.

In another preferred embodiment, periphery 29 of top portion 22 of valve plug 20 has a straight section 45 which is substantially parallel to stem assembly axis 33 and which begins just above seat-engaging portion 25 of valve plug 20. In such an embodiment, when valve plug 20 is engaged in a seat 47 of seat ring 38, straight section 45 is adjacent and above seat 47. A lower end 49 of curved surface 30, in this embodiment, is located where the top end of straight section 45 terminates. Preferably, straight section 45 is about 1/32–1/16 inches long.

Straight section 45, without significantly decreasing the flow capacity of valves having curved surface 30, facilitates manufacture of valve plugs having curved surface 30. Straight section 45 facilitates machining and part inspection.

In a highly preferred embodiment, periphery 29 of top portion 22 has straight section 40 and straight section 45. In this highly preferred embodiment, the thickness of top portion 22 is approximately the maximum radius of curvature for curved surface 30. This is so, because of geometric constraints on curved surface 30. One constraint in this embodiment is that periphery 29 of top portion 22 at upper end 42 of curved surface 30 is substantially perpendicular to stem assembly axis 33. Another constraint is that periphery 29 of top portion 22 at lower end 49 of curved surface 30 is substantially parallel stem assembly axis 33. Thus, in this embodiment, periphery 29 of top portion 22 at lower end 49 is substantially perpendicular to periphery 29 of top portion 22 at upper end 42.

When valve 10 is in a closed position, seat-engaging portion 25 of valve plug 20 rests on seat 47 and no fluid can pass through thru hole 35. In an open position, valve plug 20 is raised above seat 47, leaving thru hole 35 at least partially unblocked, enabling fluid to flow through thru hole 35. In a flow down condition, fluid flows from an upper cavity 55, past valve plug 20, through thru hole 35 past a body web 59 to a lower cavity 62.

When top portion 22 of valve plug 20 is curved in a substantially convex fashion, as shown in FIGS. 1–3 and 5, flow in the flow down condition, with valve plug 20 in the open position, is increased.

When valve 10 is in a flow up condition, fluid flows from lower cavity 62, past body web 59, through thru hole 35, past valve plug 20, and then into upper cavity 55. A slight increase in flow capacity has been found, in flow up condition, in valves having curved surface 30.

Example 1

Tests were performed to compare a standard valve plug with valve plugs in accordance with the present invention. The tests employed a valve having a 1.5 inch diameter thru hole. The valve had straight sections 40 and 45. Straight section 40 was approximately 0.31 inches long, and straight section 45 was approximately 0.07 inches long. Unlike the stem assemblies in the Figures, the stem assemblies used in this Example did not have curved surface 15 where the stem and the valve plug met.

Without a curved surface 30 on the top portion of the valve plug, the liquid flow capacity coefficient ($C_V$) was 43.1. After machining curvature of a radius of 0.25 inches onto the surface of the valve plug top portion, the capacity increased to 45.6 $C_V$. Thus, $C_v$ increased in the flow down condition 6% after machining a 0.25 inch radius of curvature on the surface of the top portion of the valve plug. A valve plug with a 0.19 inch radius of curvature had only a 2% increase in flow capacity over a valve having a standard valve plug. The capacity in the flow up condition also improved, but only by 0.6%.

Representative examples of ratios of radius of curvature of the top portion of the valve plug to thru hole diameter are: 0.22/1.12; 0.25/1.5; 0.25/2.5; 0.44/3.25. Comparison tests have not been performed on valves having the above dimensions. The above dimensions are merely set forth for example and are not intended to be limiting, as a great variety of ratios can be practiced within the scope of the invention.

Valve 10 can operate as a control valve which can be adjusted to maintain flow levels at amounts between maximum flow and no flow. This is accomplished by varying the amount of travel of stem assembly 21 between a fully opened position, and a fully closed position in which valve plug 20 is engaged in seat 47. When between the fully opened and fully closed positions valve 10 maintains flow at a level greater than zero flow but less than full flow. As is already well known in the art, variation of the size and shape of plug contour 28 of valve plug 20 affects the amount of flow at various degrees of stem assembly 21 travel. The improvements in flow capacity achieved by the present invention can be achieved as well with any of many different plug contour 28 geometries, such as would be employed in standard control valves.

In another preferred embodiment an annular perimeter 66 of body web 59 has a curved surface 68. Curved surface 68 is oriented so that a channel 71, defined by annular perimeter 66, widens radially further below seat ring 38. In flow up condition, curved surface 68 of body web 59 can increase flow capacity significantly. A curved surface 68 having any radius of curvature has been found to be more effective than no curved surface 68 for increasing flow capacity, especially when valve 10 is in flow up condition.

Preferably, a portion 75 of body web 59 below and adjacent seat ring 38 is substantially uncurved and substantially parallel stem assembly axis 33. Below uncurved portion 75, moving in the downward direction, channel 71 increases in cross-sectional area. An upper end 78 of curved surface 68 is located adjacent and below the termination of uncurved portion 75 of body web 59. Uncurved portion 75 of body web 59 facilitates manufacture of valves having curved surface 68, without significantly decreasing the flow capacity of valves having curved surface 68. Uncurved portion 75 facilitates machining of annular perimeter 66 of body web 59 adjacent seat ring 38.

Example 2

Testing was performed to determine the impact of body web curvature on flow capacity. The tests employed a valve having a 1.5 inch diameter thru hole and a straight section 75. Straight section 75 had a length of approximately 0.06 inches. Unlike the stem assemblies in the Figures, the stem assemblies used in this Example did not have curved surface 15 where the stem and the valve plug met.

Without body web curvature on the annular perimeter, the capacity was 42.7 $C_V$ in the flow up condition. After machining curved surface 68 onto the body web annular perimeter, the capacity increased to 47.1 $C_V$, an improvement of 10%. The flow capacity increase in the flow down condition was not as significant.

When larger valve sizes are employed, larger radii of curvature will be possible, thus the teachings of the Examples are not meant to be limiting in size or in other parameters. Representative examples of ratios of radius of curvature of the curved surface of the body web to thru hole diameter are: 0.19/0.75; 0.25/1.12; 0.25/1.5; 0.31/2.5; 0.31/3.25. Comparison tests have not been performed on valves having the above dimensions. The above dimensions are merely set forth for example and are not intended to be limiting, as a great variety of ratios can be practiced within the scope of the invention.

Figure 4:
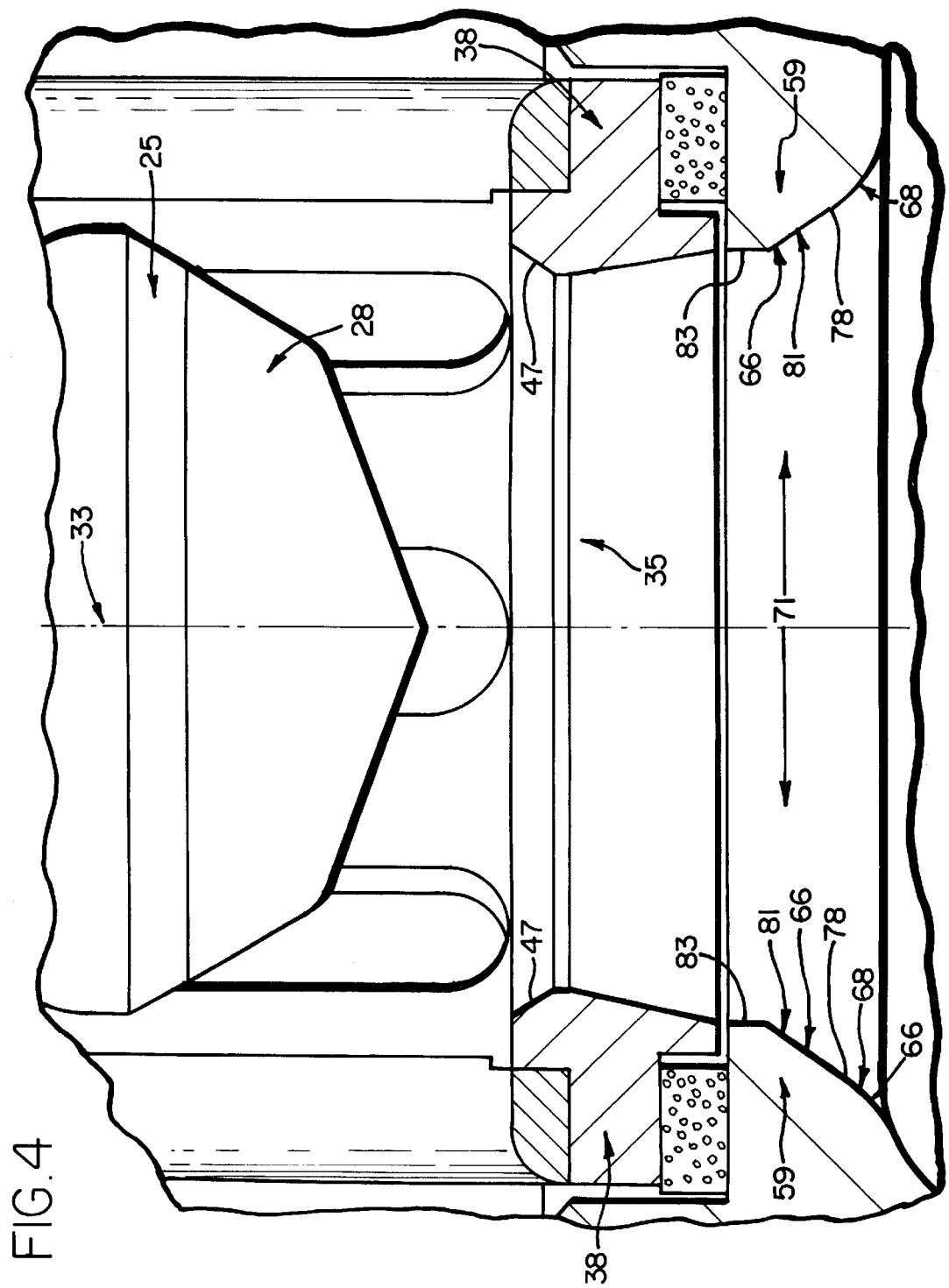
FIG. 4 is an enlarged fragmentary view of an alternative embodiment of the present invention in which the body web has an oblique straight portion above the curved surface of the body web.

In a further embodiment, an oblique straight portion 81 of body web 59 extends from the bottom of seat ring 38 outward at an angle. FIG. 4 depicts a variation of this embodiment discussed further below. Oblique straight portion 81 is substantially uncurved from below and adjacent seat ring 38 to upper end 78 of curved surface 68. Upper end 78 of curved surface 68, in this embodiment, is oriented so that channel 71, defined by annular perimeter 66, widens radially further below seat ring 38. Thus, body web 59 has curved surface 68, but curved surface 68 does not begin immediately below seat ring 38 in this embodiment. This embodiment has the flow capacity advantages of those embodiments in which curved surface 68 of body web 59 is adjacent seat ring 38.

Additionally, oblique straight section 81 has been found to have flow capacity benefits of its own, although it is mainly advantageous for manufacturing purposes. Oblique straight section 81 facilitates machining of annular perimeter 66 of body web 59, particularly in embodiments without seat ring 38. An angle of about 35 degrees between oblique straight section 81 and stem assembly axis 33 has been found to be particularly advantageous for manufacturing body webs in accordance with the present invention.

Preferably, upper end 78 of curved surface 68 is tangent to oblique straight portion 81 of body web 59 where upper end 78 and oblique straight portion 81 intersect.

In another embodiment, shown in FIG. 4, an uncurved portion 83 of annular perimeter 66 is substantially vertical and is located immediately below seat ring 38 and above the top of oblique straight section 81.

Figure 2:
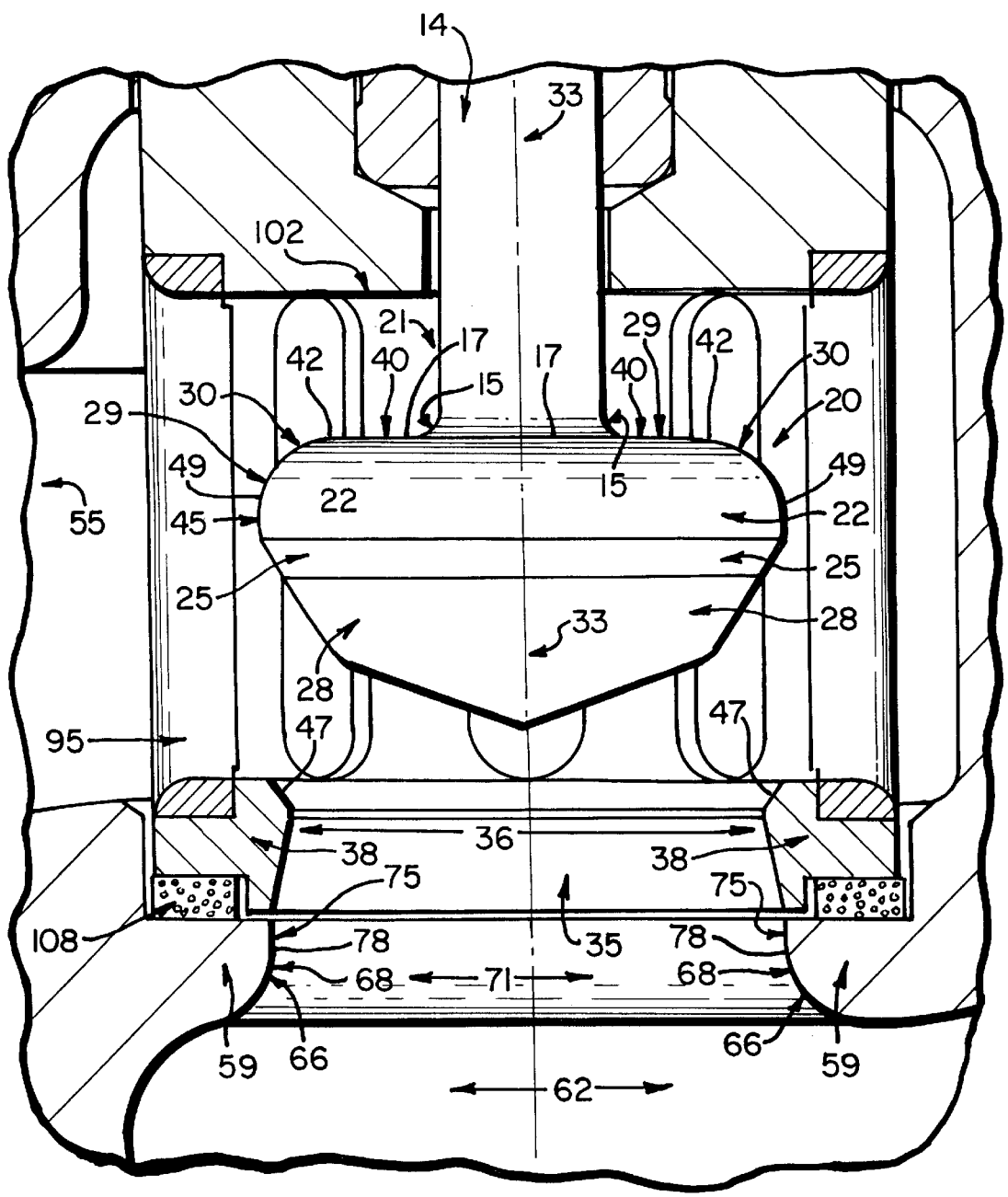
FIG. 2 is an enlarged fragmentary view illustrating the valve plug and the body web in FIG. 1.
Figure 3:
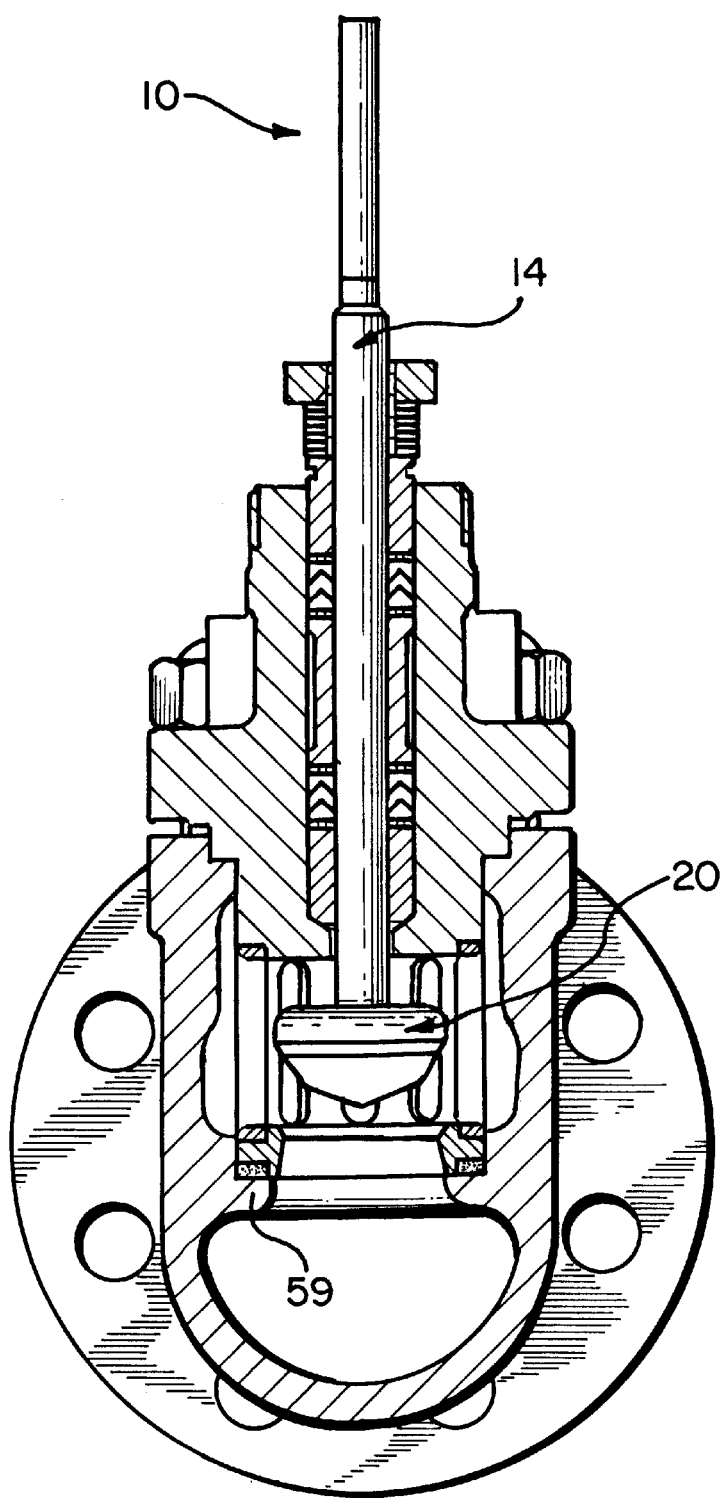
FIG. 3 is a sectional view taken along line 3—3 of FIG. 1.

In a further embodiment, curved surface 68 of body web 59 is substantially uniform radially with respect to stem assembly axis 33, as depicted in FIG. 2. In this fashion, a cross-section taken perpendicular to stem assembly axis 33 comprises annular perimeter 66 of body web 59 defining channel 71 having a substantially circular cross-section. The cross-section remains substantially circular until lower cavity 62 is reached.

In a still further embodiment, curved surface 30 of top portion 22 of valve plug 20 is substantially uniform radially with respect to stem assembly axis 33. In this fashion, a cross-section taken perpendicular to stem assembly axis 33 comprises valve plug 20 having a substantially circular cross-section.

In a highly preferred embodiment top portion 22 of valve plug 20 has curved surface 30, and body web 59 has curved surface 68. Such an embodiment, shown in FIGS. 1–3 and 5, exhibits the advantages of increased flow capacity whether operating in the flow up condition or in the flow down condition. This highly preferred embodiment may have any of the features described above with regard to curved surface 30 of top portion 22 of valve plug 20 and curved surface 68 of body web 59. For example, a bidirectional valve may have curved surface 30 as well as straight section 40 and straight section 45 on top portion 22 of valve plug 20 and have body web 59 having curved surface 68 and uncurved portion 75 below and adjacent seat ring 38.

The thickness of body web 59, in a direction from annular perimeter 66 toward a flange 85, is generally increased as the size of valve 10 is increased.

Figure 5:
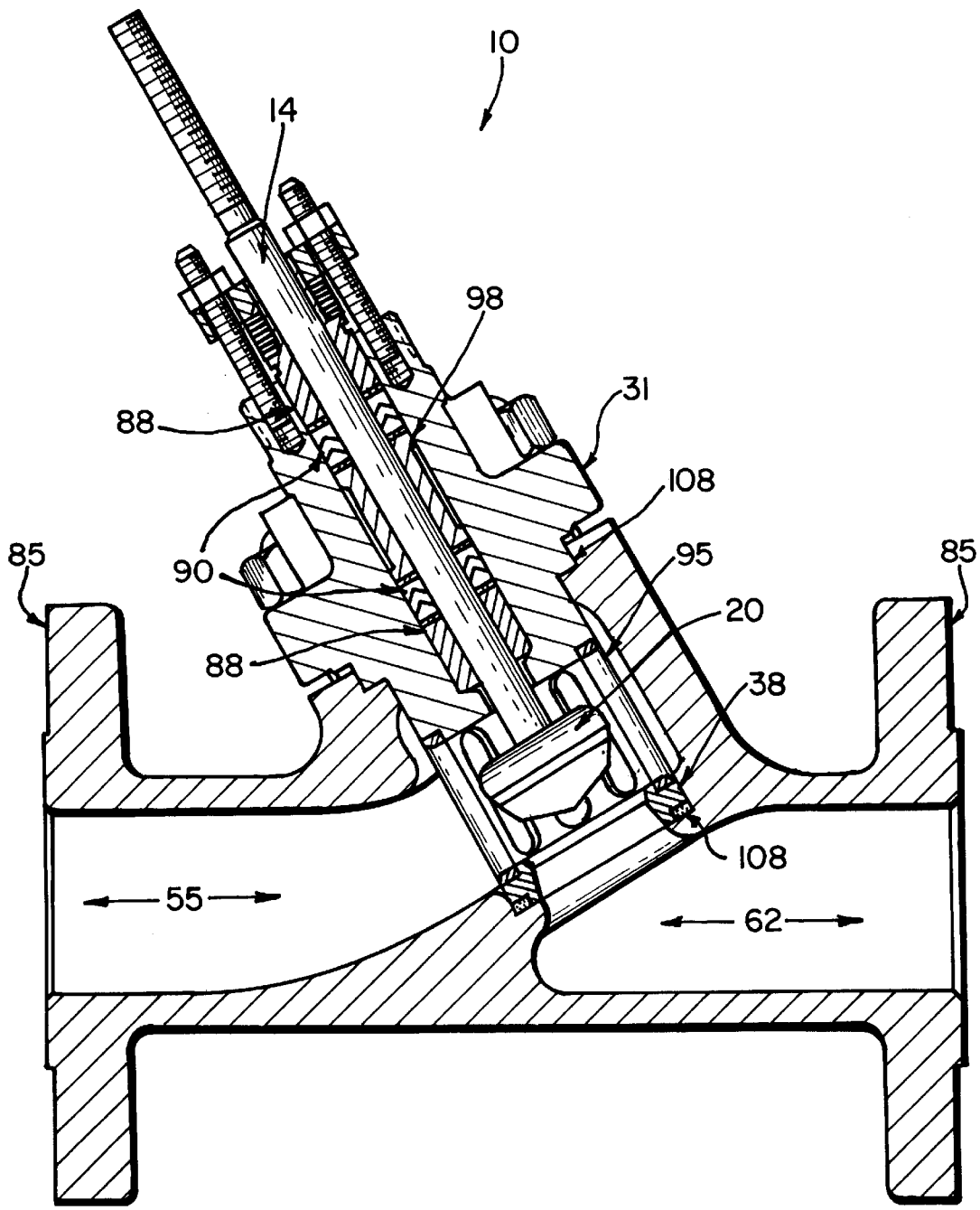
FIG. 5 is a sectional view of an alternative embodiment of the present invention in which the valve has an angle body.

As depicted in FIG. 5, valve 10 may be configured as an angle body valve. The valve shown has all valve components at 30 degrees except for flanges 85. Flanges 85, which are bolted into a pipeline (not shown) remain substantially upright whether valve 10 is upright or at an angle. Angles other than 30 degrees are possible.

Other aspects of preferred embodiments include bushings 88 and sets of packing 90. Bushings 88 and sets of packing 90 may be placed around and adjacent stem 14 above a seat retainer 95. A lantern ring 98 or similar device may be placed around and adjacent stem 14 to operate as a spacer.

Bonnet 31 may be placed to the exteriors of bushings 88 and sets of packing 90. Bonnet 31 runs much of the length of stem 14 and, preferably, is disposed against top 102 of seat retainer 95. Gaskets 108 may be placed in a number of regions.

In some embodiments, particularly those where seat ring 38 screws into body web 59, no seat retainer is employed. In embodiments in which seat 47 is machined directly into body web 59, there is no seat ring, no seat retainer, and no gasket immediately below the seat.

What is claimed is:

1. A bidirectional fluid control valve, comprising:

a valve body having a fluid inlet and a fluid outlet and including a fluid passageway for bidirectionally communicating fluid between the fluid inlet and the fluid outlet;

a valve seat within the fluid passageway;

a valve stem movably mounted in the valve body including a plug for engaging the valve seat, said plug having a top portion and a bottom portion;

said plug top portion having a convex curved exterior surface extending towards the plug bottom portion;

a body web for containing said valve seat and including curved body web channel surfaces defining a channel located immediately adjacent the valve seat and on a side of the valve seat opposite the plug;

the curved body web channel surfaces having a convex curvature, wherein a radius of the channel measured from a longitudinal axis through the channel increases as the distance from the valve seat increases;

wherein the body web has a straight section extending from a location adjacent the valve seat to the convex curvature of the body web, the straight section being oriented obliquely with respect to the longitudinal axis through the channel.

2. The bidirectional valve of claim 1, wherein the curved body web channel surfaces have a straight section extending from a location immediately adjacent the valve seat to the convex curvature of the body web, the straight section being substantially parallel to the longitudinal axis through the channel.

3. The bidirectional valve of claim 1, wherein a ratio of a radius of curvature of the convex curvature of the body web to a diameter of a thru hole defined by the valve is between about 0.1–0.25.

4. The bidirectional valve of claim 1, wherein a radius of curvature of the convex curved exterior surface of the top portion of the valve plug is between about 0.2 and 0.45 inches.

5. The bidirectional valve of claim 1, wherein a ratio of the radius of curvature of the convex curved exterior surface of the top portion to a diameter of a thru hole defined by the valve is about 0.1–0.2.

6. The bidirectional valve of claim 1, wherein the top portion of the plug includes a lateral surface integral with the convex curved exterior surface of the top portion, the lateral surface being substantially perpendicular to a longitudinal axis of the plug and located between a bottom of the stem and the convex curved exterior surface of the top portion of the plug.

7. The bidirectional valve of claim 6, wherein the plug includes:

a middle portion located between the top portion and the bottom portion for engaging the valve seat; and a straight surface substantially parallel to the longitudinal axis of the plug and extending from the middle portion of the plug to the convex curved exterior surface of the top portion of the plug.

8. The bidirectional valve of claim 1, wherein the plug includes:

a middle portion located between the top portion and the bottom portion for engaging the valve seat; and a straight surface substantially parallel to a longitudinal axis of the plug and extending from the middle portion of the plug to the convex curved exterior surface of the top portion of the plug.

* * * * *